(12) United States Patent
Wu

(10) Patent No.: US 12,075,503 B2
(45) Date of Patent: Aug. 27, 2024

(54) METHOD FOR HANDLING CELL CONNECTION FAILURE, TERMINAL DEVICE, AND NETWORK SIDE DEVICE

(71) Applicant: VIVO MOBILE COMMUNICATION CO.,LTD., Guangdong (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 394 days.

(21) Appl. No.: 17/482,890

(22) Filed: Sep. 23, 2021

(65) Prior Publication Data

US 2022/0015175 A1 Jan. 13, 2022

Related U.S. Application Data

(63) Continuation of application No. PCT/CN2020/080692, filed on Mar. 23, 2020.

(30) Foreign Application Priority Data

Mar. 25, 2019 (CN) .......................... 201910228820.9

(51) Int. Cl.
  *H04W 76/18* (2018.01)
  *H04W 74/0816* (2024.01)
  *H04W 76/19* (2018.01)

(52) U.S. Cl.
  CPC ....... *H04W 76/18* (2018.02); *H04W 74/0816* (2013.01); *H04W 76/19* (2018.02)

(58) Field of Classification Search
  CPC .. H04W 76/18; H04W 74/0816; H04W 76/19
  See application file for complete search history.

(56) References Cited

U.S. PATENT DOCUMENTS

| | | | |
|---|---|---|---|
| 2015/0092686 A1* | 4/2015 | Cui | ....................... H04W 36/36 370/328 |
| 2015/0181479 A1 | 6/2015 | Lin et al. | |
| 2017/0347365 A1 | 11/2017 | Xu | |
| 2018/0332626 A1 | 11/2018 | You | |
| 2019/0387420 A1 | 12/2019 | Li et al. | |

(Continued)

FOREIGN PATENT DOCUMENTS

| | | |
|---|---|---|
| CN | 106255122 A | 12/2016 |
| CN | 106454910 A | 2/2017 |
| CN | 107371168 A | 11/2017 |

(Continued)

OTHER PUBLICATIONS

European Search Report dated Apr. 22, 2022 as received in application No. 20779231.8.

(Continued)

*Primary Examiner* — Basil Ma
(74) *Attorney, Agent, or Firm* — Price Heneveld, LLP

(57) ABSTRACT

A method for handling cell connection failure is provided, applied to a terminal device, where the method includes: determining whether connecting to a target serving cell has failed; and performing, in a case that connecting to the target serving cell has failed, connection failure handling based on serving cell related information, where the serving cell related information includes at least one of the number of cells and a cell type.

19 Claims, 4 Drawing Sheets

(56) References Cited

U.S. PATENT DOCUMENTS

| | | | |
|---|---|---|---|
| 2021/0112592 A1* | 4/2021 | Lee | H04W 74/006 |
| 2021/0204321 A1* | 7/2021 | Babaei | H04L 1/1835 |

FOREIGN PATENT DOCUMENTS

| | | |
|---|---|---|
| CN | 107690162 A | 2/2018 |
| CN | 107770868 A | 3/2018 |
| WO | 2016182662 A1 | 11/2016 |
| WO | 2017025004 A1 | 2/2017 |
| WO | 2019031796 A1 | 2/2019 |

OTHER PUBLICATIONS

Indian Office Action dated Apr. 7, 2022 as received in application No. 202127047958.

Japanese Office Acton dated Oct. 3, 2022 as received in application No. 2021-556951.

"Impact of UL LBT failure" 3GPP TSG-RAN WG2 Meeting #105, R2-1901181, Feb. 2019, Nokia.

"Discussion on RLF for NR-U" 3GPP TSG-RAN WG2 #105, R2-1901345, Feb. 2019, Huawei, HiSilicon.

"Handling UL LBT failures" 3GPP TSG RAN WG2 #105, Tdoc R2-1901674 Feb. 2019, Ericsson.

International Search Report and Written Opinion dated Oct. 7, 2021 as received in application No. PCT/CN2020/080692.

"Considerations on 4-step RACH procedure for NR-U" 3GPP TSG RAN WG2 NR #104 Meeting R2-1816829 Spokane, US, Nov. 12-16, 2018. ZTE.

201910228820.9 Chinese Office Action dated Mar. 29, 2021 as received in application No. 201910228820.9.

\* cited by examiner

METHOD FOR HANDLING CELL CONNECTION FAILURE, TERMINAL DEVICE, AND NETWORK SIDE DEVICE

CROSS-REFERENCE TO RELATED APPLICATIONS

This application is continuation application of PCT International Application No. PCT/CN2020/080692 filed on Mar. 23, 2020, which claims priority to Chinese Patent Application No. 201910228820.9, filed in China on Mar. 25, 2019, which are incorporated in their entireties by reference herein.

TECHNICAL FIELD

This disclosure relates to the field of communications technologies, and in particular, to a method for handling cell connection failure, a terminal device, and a network-side device.

BACKGROUND

At present, in new radio (NR) mobile communications systems (NR system for short), unlicensed bands are shared bands. If an unlicensed band is used to transmit data, a transmitting end of the data needs to comply with rules for use of the unlicensed band, that is, the transmitting end needs to monitor, before transmitting data, whether the unlicensed band is occupied (or in a free state). If the unlicensed band is not occupied (or in a free state), the transmitting end can use the unlicensed band to transmit data; or if the unlicensed band is occupied (or in a busy state), that is, the transmitting end fails in listen before talk (Listen-Before-Talk, LBT), the transmitting end cannot use the unlicensed band to transmit data, to be specific, the transmitting end fails to connect to a cell, which may affect reliability of data transmission.

SUMMARY

According to a first aspect, an embodiment of this disclosure provides a method for handling cell connection failure, applied to a terminal device, where the method includes:
  determining whether connecting to a target serving cell has failed; and
  performing connection failure handling based on serving cell related information in a case that connecting to the target serving cell has failed, where the serving cell related information includes at least one of the number of cells and a cell type.

According to a second aspect, an embodiment of this disclosure provides a method for handling cell connection failure, applied to a network-side device, where the method includes:
  configuring configuration information related to uplink transmission, where the configuration information includes at least one of connection failure detection information and connection failure recovery information; and
  transmitting the configuration information to a terminal device, so that the terminal device determines, based on the configuration information, whether connecting to a target serving cell has failed, and in a case that connecting to the target serving cell has failed, performs connection failure handling based on serving cell related information, where the serving cell related information includes at least one of the number of cells and a cell type.

According to a third aspect, an embodiment of this disclosure provides a terminal device, where the terminal device includes:
  a determining module, configured to determine whether connecting to a target serving cell has failed; and
  a handling module, configured to: in a case that connecting to the target serving cell has failed, perform connection failure handling based on serving cell related information, where the serving cell related information includes at least one of the number of cells and a cell type.

According to a fourth aspect, an embodiment of this disclosure provides a terminal device, including a memory, a processor, and a program stored in the memory and capable of running on the processor, where when the program is executed by the processor, steps of the method according to the first aspect are implemented.

According to a fifth aspect, an embodiment of this disclosure provides a computer-readable storage medium, where the computer-readable storage medium stores a program, and when the program is executed by a processor, the steps of the method according to the first aspect are implemented.

According to a sixth aspect, an embodiment of this disclosure provides a network-side device, where the network-side device includes:
  a configuration module, configured to configure configuration information related to uplink transmission, where the configuration information includes at least one of connection failure detection information and connection failure recovery information; and
  a transmitting module, configured to transmit the configuration information to a terminal device, so that the terminal device determines, based on the configuration information, whether connecting to a target serving cell has failed, and in a case that connecting to the target serving cell has failed, performs connection failure handling based on serving cell related information, where the serving cell related information includes at least one of the number of cells and a cell type.

According to a seventh aspect, an embodiment of this disclosure provides a network-side device, including a memory, a processor, and a program stored in the memory and capable of running on the processor, where when the program is executed by the processor, steps of the method according to the second aspect are implemented.

According to an eighth aspect, an embodiment of this disclosure provides a computer-readable storage medium, where the computer-readable storage medium stores a program, and when the program is executed by a processor, the steps of the method according to the second aspect are implemented.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the accompanying drawings.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In related art, for new radio (NR) mobile communications systems (NR system for short), currently a connection failure at user equipment (UE, which may also be referred to as a mobile terminal, mobile user equipment, or the like) mainly includes the following cases: (1) a handover failure, for example, a handover is not completed within a specified time, such as timer t304 timeout; (2) a secondary cell group (SCG) change failure, for example, an access to a new SCG is not completed within a specified time, such as timer t307 timeout; and (3) a radio link failure (RLF). For the timer t304 or the timer t307, the UE starts up a timer correspondingly upon receiving a handover command or an SCG change command, and the UE stops the timer when a cell random access procedure is completed.

A radio link connection failure mainly includes: (1) a physical layer failure, for example, timer t310 timeout; (2) a medium access control (MAC) layer random access failure, for example, the maximum number of random access attempts is reached; (3) an indication indicating that the maximum number of retransmissions at radio link control (RLC) layer is reached, for example, the maximum number of RLC layer retransmissions is reached; and (4) a beam failure, for example, beam recovery procedure failure.

Optionally, for the foregoing radio link connection failure case that the maximum number of retransmissions at RLC layer is reached, a connection re-establishment procedure needs to be triggered in the serving cell related art in case of connection failure. When the UE initiates a connection re-establishment procedure, the UE may perform a cell selection process, and specifically, perform cell selection by scanning all frequencies. After finding a suitable cell, the UE initiates a connection re-establishment procedure in the cell. No solution is given for other cases of connection failure.

However, unlicensed bands are shared bands. When the UE performs uplink transmission in an unlicensed band, if uplink data cannot be transmitted, the connection of the UE may not work. Therefore, a solution is required to accurately detect and specifically handle a cell connection failure, so as to autonomously recover the connection and improve reliability of data transmission.

The technical solutions provided in the embodiments of this disclosure are described in detail below with reference to the accompanying drawings.

Figure 1:
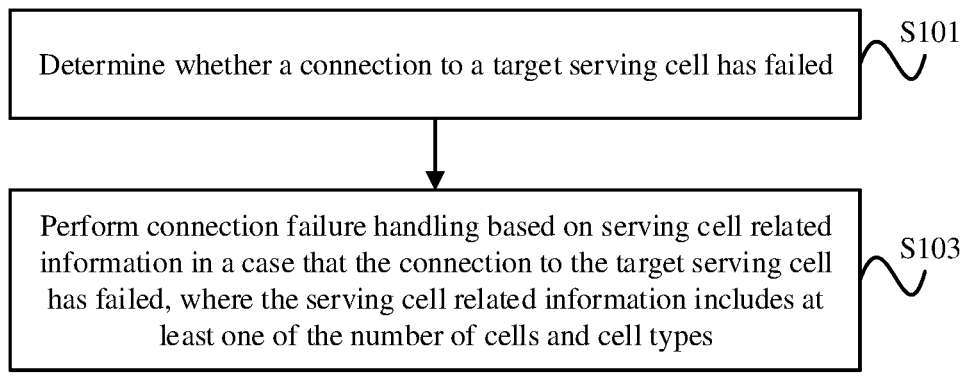
FIG. 1 is a schematic flowchart of a method for handling cell connection failure according to an embodiment of this disclosure.

Referring to FIG. 1, a method for handling cell connection failure is provided in this embodiment of this disclosure, applied to a terminal device. The method includes:

S101: Determine whether connecting to a target serving cell has failed.

Optionally, the terminal device may detect, based on specific conditions configured by a network-side device or prescribed by a protocol, whether connecting to the target serving cell has failed. The number of target serving cells may be one or more, and the target serving cell may be at least one of a primary cell, a primary secondary cell, or a secondary cell.

S103: Perform connection failure handling based on serving cell related information in a case that connecting to the target serving cell has failed, where the serving cell related information includes at least one of the number of cells and a cell type.

In this embodiment of this disclosure, whether connecting to a target serving cell has failed is monitored, and in a case of determining that connecting to the target serving cell has failed, corresponding connection failure handling is performed based on serving cell related information. Specifically, the connection failure handling may be performed based on at least one of the number of serving cells and a cell type. As such, a cell connection failure is accurately detected, and a proper connection failure handling manner is determined for the cell connection failure based on specific related information of the serving cell, so as to handle the failure timely and efficiently according to the connection failure handling manner, thereby autonomously recovering the cell connection and improving reliability of data transmission.

It can be understood that in the method for handling cell connection failure in the embodiments of this disclosure, it is not necessary to consider a specific type of a cell connection failure, and in a case accurately determining that connecting to the target serving cell has failed, proper connection failure handling can be implemented based on related information of the serving cell of the terminal device. Obviously, compared with the approach in the related art that connection re-establishment can be triggered only when the maximum number of RLC layer retransmissions is reached, not only accurate detection of a cell connection failure can be implemented, but also timely and efficient connection failure handling can be implemented in accordance with a specific condition when the cell connection has failed, so as to autonomously recover the connection, thereby improving reliability of data transmission.

Optionally, the foregoing case of determining that connecting to the target serving cell has failed may include a case that connecting to one or more frequencies corresponding to the target serving cell has failed.

It should be noted that the serving cell related information includes but is not limited to at least one of the number of cells and a cell type.

Optionally, in the method for handling cell connection failure in the embodiments of this disclosure, the step S101 may be implemented through different embodiments, to ensure accurate detection of a cell connection failure by a diversity of detection approaches.

With reference to embodiments, the following describes in detail approaches for detecting whether connecting to the target cell has failed.

Embodiment 1

In this specific embodiment, the foregoing step S101 may be specifically performed as follows:
- determining the number of uplink transmission failures on the target serving cell within a first preset time window; and
- determining, based on the number of uplink transmission failures, whether connecting to the target serving cell has failed.

It can be understood that in determining whether connecting to the target serving cell has failed, the number of uplink transmission failures on the target serving cell within a time window is counted, that is, counting the occurrences of uplink transmission failure on the target serving cell within a first preset time window, and based on a quantified statistics result of uplink transmission failures within the first preset time window, detection of whether connecting to the target serving cell has failed can be implemented efficiently and accurately.

Specifically, the foregoing technical solution of determining whether connecting to the target serving cell has failed based on the number of uplink transmission failures, on one hand, may be specifically performed as follows:
- determining that connecting to the target serving cell has failed if the number of uplink transmission failures is greater than or equal to a value of threshold regarding the number of failures.

It can be understood that the counted number of uplink transmission failures within the first preset time window is directly compared with the value of threshold regarding the number of failures and when it is found that the number of uplink transmission failures has reached or exceeded the value of threshold regarding the number of failures, it is determined that connecting to the target serving cell has failed, where the value of threshold regarding the number of failures may be a value configured by the network-side device, or a value prescribed by a protocol.

Optionally, the foregoing number of uplink transmission failures is a total number of consecutive and failed uplink transmissions.

It can be understood that the counted number of uplink transmission failures on the target serving cell is optionally determined as a total number of consecutive and failed uplink transmissions on the target serving cell within the first preset time window. That is, only when uplink transmission failures occur consecutively within the first preset time window, it is regarded as a valid statistic result of the number of uplink transmission failures within the first preset time window. This helps improve reliability and stability of a detection result obtained from determining, based on the number of uplink transmission failures, whether connecting to the target serving cell has failed.

Figure 2:
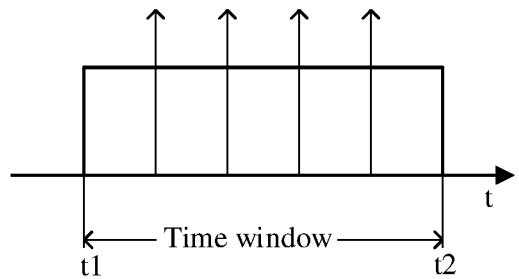
FIG. 2 is a schematic diagram of a time window according to an embodiment of this disclosure.

For example, as shown in FIG. 2, a length of a first preset time window is a time length from a time position t1 to a time position t2. For example, the length of the first preset time window can be set to 100 ms according to configuration by a network-side device or prescription by a protocol. Then, the number of uplink transmission failures on the target serving cell can be counted from the time position t1 to the time position t2. Optionally, the number of uplink transmission failures is a total number of consecutive and failed uplink transmissions on the target serving cell counted from the time position t1 to the time position t2.

Specifically, if within a corresponding time window from the time position t1 to the time position t2, the counted number of uplink transmission failures is 8 and the value of threshold regarding the number of failures is 6, it may be determined that connecting to the target serving cell has failed within the time window. The number of uplink transmission failures, 8, may be a total number of uplink transmissions that are performed consecutively on the target serving cell for eight times and all of which have failed within the time window.

Specifically, the foregoing technical solution of determining whether connecting to the target serving cell has failed based on the number of uplink transmission failures, on the other hand, may be specifically performed as follows:
- determining an uplink transmission failure probability based on the number of uplink transmission failures; and
- determining that connecting to the target serving cell has failed if the uplink transmission failure probability is greater than or equal to a failure probability threshold.

It can be understood that firstly, the uplink transmission failure probability within the time window can be determined based on the counted number of uplink failures within the first preset time window, then the uplink transmission failure probability is compared with a failure probability threshold, and when it is found that the uplink transmission failure probability has reached or exceeded the failure probability threshold, it is determined that connecting to the target serving cell has failed, where the failure probability threshold may be a value configured by the network-side device, or a value prescribed by a protocol.

For example, referring to FIG. 2, if within a corresponding time window from the time position t1 to the time position t2, the counted number of uplink transmission failures on the target serving cell is 9, and the total number of uplink transmissions on the target serving cell is 10, it may be determined that the uplink transmission failure probability within the time window is 90%. In a case that the failure probability threshold is 80%, it may be determined that connecting to the target serving cell has failed within the time window. The failure probability threshold may be set to 100%.

Embodiment 2

In the method for handling cell connection failure in the embodiments of this disclosure, in addition to accurate detection of whether connecting to the target serving cell has failed according to the corresponding contents recorded in Embodiment 1, the step S101 in the specific embodiment may further be specifically performed as follows:
- increasing a first count value by 1 if an uplink transmission state on the target serving cell is a first preset state; and
- determining that connecting to the target serving cell has failed, if the first count value is greater than or equal to a first count threshold, or after the first count value is greater than or equal to the first count threshold and an uplink transmission failure timer expires.

It can be understood that in determining whether connecting to the target serving cell has failed, a statistic on specific uplink transmission states on the target serving cell is performed, and based on a quantified statistics result for uplink transmission states, detection of whether connecting to the target serving cell has failed is implemented efficiently and accurately.

Specifically, a quantified statistic on the first preset state on the target serving cell is performed, that is to increase the first count value by 1 each time when the uplink transmission state on the target serving cell is the first preset state, for example, using a first counter to count the number of occurrences of the first preset state.

In a specific aspect, a quantified statistics result of the first preset state on the target serving cell, that is, the first count value, may be compared with a first count threshold, and when it is found that a current first count value has reached or exceeded the first count threshold, it is directly determined that connecting to the target serving cell has failed.

Optionally, in the foregoing process of performing a statistic on the first preset state on the target serving cell by using the first count value, the following may be further included:

The first count value is reset if an uplink transmission state on the target serving cell is a second preset state, and the first count value is increased by 1 if an uplink transmission state on the target serving cell is the first preset state.

It can be understood that in the process of counting the first count value, each time when the detected uplink transmission state on the target serving cell is the first preset state, the corresponding first count value is increased by 1, and each time when the detected uplink transmission state on the target serving cell is the second preset state, the previous counted first count value is reset to an initial value (for example, 0). Later when the detected uplink transmission state on the target serving cell is the first preset state again, the first count value is recalculated. Such a cycle repeats until it is determined that the first count value has reached or exceeded the first count threshold, that is, carrying out a quantified result statistic on the number of consecutive times that the uplink transmission state on the target serving cell is the first preset state.

Optionally, after the first count value is greater than or equal to the first count threshold and before the uplink transmission failure timer expires, at least one of operations of resetting the first count value or stopping the uplink transmission failure timer is performed, in a case that a second count value used when the uplink transmission state on the target serving cell is a second preset state is greater than or equal to a second count threshold.

It can be understood that during running of the uplink transmission failure timer, quantified statistic on a case that the transmission state on the target serving cell is the second preset state is performed, that is to increase the second count value by 1 each time when the uplink transmission state on the target serving cell is the second preset state, for example using a second counter to count the number of occurrences of the second preset state. Optionally, a quantified statistics result on the second preset state on the target serving cell, that is, the second count value, may be compared with a second count threshold, and when it is found that a current second count value has reached or exceeded the second count threshold, the operation of resetting the first count value and/or the operation of stopping the uplink transmission failure timer is performed, that is, in this case, it can be determined that connecting to the target serving cell does not fail.

Optionally, the second count value is the total number of consecutive times that the uplink transmission state on the target serving cell is the second preset state.

It can be understood that during running of the uplink transmission failure timer, each time when the detected uplink transmission state on the target serving cell is the second preset state, the corresponding second count value is increased by 1, and each time when the detected uplink transmission state on the target serving cell is the first preset state, the previous counted second count value is reset to an initial value (for example, 0). Later when the detected uplink transmission state on the target serving cell is the second preset state again, the second count value is recalculated. Such a cycle repeats until it is determined that the second count value has reached or exceeded the second count threshold, that is, during running of the uplink transmission failure timer, performing a quantified result statistic on the number of consecutive times that the uplink transmission state on the target serving cell is the second preset state.

In another specific aspect, a quantified statistics result on the first preset state on the target serving cell, that is, the first count value, may be compared with a first count threshold, and after it is found that a current first count value has reached or exceeded the first count threshold, the uplink transmission failure timer is started up. After a period of time elapses, in a case that a timing result of the uplink transmission timer expires, then it is determined that connecting to the target serving cell has failed.

Optionally, in the foregoing process of performing a statistic on the first preset state on the target serving cell by using the first count value, the following may be further included:

The first count value is reset if an uplink transmission state on the target serving cell is a second preset state, and the first count value is increased by 1 if an uplink transmission state on the target serving cell is the first preset state.

It can be understood that in the process of counting the first count value, each time when the detected uplink transmission state on the target serving cell is the first preset state, the corresponding first count value is increased by 1, and each time when the detected uplink transmission state on the target serving cell is the second preset state, the previous counted first count value is reset to an initial value (for example, 0). Later when the detected uplink transmission state on the target serving cell is the first preset state again, the first count value is recalculated. Such a cycle repeats until it is determined that the first count value has reached or exceeded the first count threshold, that is, carrying out a quantified result statistic on the number of consecutive times that the uplink transmission state on the target serving cell is the first preset state.

Optionally, after the first count value is greater than or equal to the first count threshold and before the uplink transmission failure timer expires, at least one of operations of resetting the first count value or stopping the uplink transmission failure timer is performed, in a case that a second count value used when the uplink transmission state on the target serving cell is a second preset state is greater than or equal to a second count threshold.

It can be understood that during running of the uplink transmission failure timer, quantified statistic on a case that the transmission state on the target serving cell is the second preset state is performed, that is to increase the second count value by 1 each time when the uplink transmission state on the target serving cell is the second preset state, for example using a second counter to count the number of occurrences of the second preset state. Optionally, a quantified statistics result on the second preset state on the target serving cell, that is, the second count value, may be compared with a second count threshold, and when it is found that a current second count value has reached or exceeded the second count threshold, the operation of resetting the first count value and/or the operation of stopping the uplink transmission failure timer is performed, that is, in this case, it can be determined that connecting to the target serving cell does not fail.

Optionally, the second count value is the total number of consecutive times that the uplink transmission state on the target serving cell is the second preset state.

It can be understood that during running of the uplink transmission failure timer, each time when the detected uplink transmission state on the target serving cell is the second preset state, the corresponding second count value is increased by 1, and each time when the detected uplink transmission state on the target serving cell is the first preset state, the previous counted second count value is reset to an initial value (for example, 0). Later when the detected uplink transmission state on the target serving cell is the second preset state again, the second count value is recalculated. Such a cycle repeats until it is determined that the second count value has reached or exceeded the second count threshold. In other words, during running of the uplink transmission failure timer, quantification of the statistic on the number of consecutive times that the uplink transmission state on the target serving cell is the second preset state is implemented.

Optionally, the first count threshold and the second count threshold may be values configured by a network-side device, or values prescribed by a protocol.

Optionally, the first preset state and second preset state can be described by specific conditions of uplink transmission within a time window, that is, the uplink transmission state on the target serving cell is determined in each second time window. A statistic on a plurality of uplink transmission states respectively corresponding to a plurality of second time windows is performed and it is determined based on the statistics result that whether connecting to the target serving cell has failed is made based on the statistics result. With a smooth statistic on a plurality of uplink transmission states corresponding to a plurality of time windows, a failure detection result may be more reliable and accurate.

Specifically, the first preset state includes at least one of the following: within the second preset time window, the number of uplink transmission failures on the target serving cell meets a first condition, or within the second preset time window, the number of uplink transmissions on the target serving cell is less than or equal to a number of uplink transmissions threshold; and the second preset state includes at least one of the following: within the second preset time window, the number of successful uplink transmissions on the target serving cell meets a second condition, or within the second preset time window, the number of uplink transmissions on the target serving cell is less than or equal to a number of uplink transmissions threshold.

It can be understood that a determined uplink transmission state on the target serving cell within each second preset time window may be one of failed uplink transmission, successful uplink transmission, or no uplink transmission.

The failed uplink transmission may refer to that the number of uplink transmission failures on the target serving cell meets a first condition within a time window (that is, the second preset time window). For example, if the number of uplink transmission failures is greater than or equal to a corresponding number threshold (for example, 8), or if an uplink transmission failure probability determined based on the number of uplink transmission failures is greater than or equal to a corresponding probability threshold (for example, 90% or 100%), it may be considered that the number of uplink transmission failures within the time window meets the first condition.

The successful uplink transmission may refer to that the number of successful uplink transmissions on the target serving cell meets a second condition within a time window (that is, the second preset time window). For example, if the number of successful uplink transmissions is greater than or equal to a corresponding number threshold (for example, 8), or if an uplink transmission success probability determined based on the number of successful uplink transmissions is greater than or equal to a corresponding probability threshold (for example, 90% or 100%), it may be considered that the number of successful uplink transmissions within the time window meets the second condition.

No uplink transmission may refer to within a time window (that is, the second preset time window), the number of uplink transmissions on the target serving cell is less than or equal to a number of uplink transmissions threshold (for example, 4).

It should be noted that the foregoing thresholds may be values configured by a network-side device, or values prescribed by a protocol.

Figure 3:
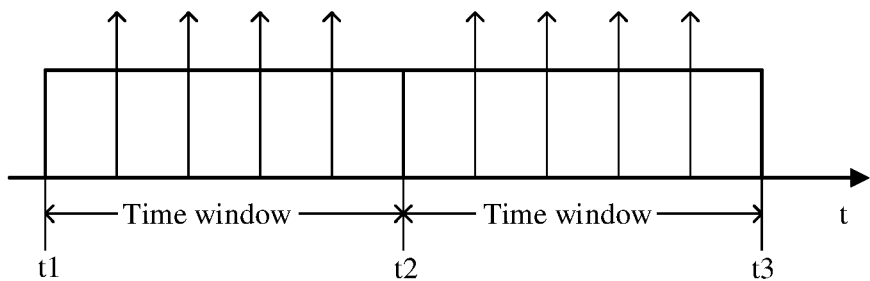
FIG. 3 is a schematic diagram of another time window according to an embodiment of this disclosure.

For example, as shown in FIG. 3, two second preset time windows are included, where a length of a $1^{st}$ second preset time window is a time length from a time position t1 to a time position t2, and a length of a $2^{nd}$ second preset time window is a time length from the time position t2 to a time position t3. For example, the length of the first preset time window can be set to 10 ms according to configuration by a network side or prescription by a protocol, that is, the time length from the time position t1 to the time position t2 is 10 ms, and the time length from the time position t2 to the time position t3 is 10 ms. Then, the number of uplink transmission failures, the number of successful uplink transmissions, and the number of uplink transmissions on the target serving cell can be counted from the time position t1 to the time position t2 and from the time position t2 to the time position t3.

If the number of uplink failures counted in the corresponding time window from the time position t1 to the time position t2 meets the first condition, the uplink transmission status corresponding to the second preset time window is failed uplink transmission; if the number of uplink transmissions counted in the corresponding time window from the time position t1 to the time position t2 meets the second condition, the uplink transmission state corresponding to the second preset time window is successful uplink transmission; and if the number of uplink transmissions counted in the corresponding time window from the time position t2 to the time position t3 does not reach the number of uplink transmissions threshold, the uplink transmission state corresponding to the second preset time window is no uplink transmission.

Optionally, no uplink transmission can be classified into either the first preset state or the second preset state, that is, the first preset state includes at least one of failed uplink transmission or no uplink transmission; and the second preset state includes at least one of successful uplink transmission or no uplink transmission.

It can be understood that there are a variety of reasons for uplink transmission failures on the target serving cell. For example, a failed uplink transmission caused by channel occupation (or channel in a busy state) may also be an uplink transmission that cannot be successfully completed due to a limited parameter such as uplink transmission power of the terminal device itself. In the method for handling cell connection failure in the embodiments of this disclosure, the focus is on the case that the failed uplink transmission on the target serving cell is caused by channel occupation.

Specifically, the failed uplink transmission on the target serving cell caused by channel occupation, on one hand, may include that a transmission failure is detected after uplink signal transmission, and then it is determined that the failure is caused by channel occupation. On the other hand, it may also include monitoring whether the channel is occupied before uplink signal transmission (that is, LBT), if it is detected that the channel is occupied, no uplink signal transmission is performed, and it is directly determined that the uplink transmission has failed, that is, in a case that the channel is occupied, it is determined that the uplink transmission on the target serving cell has failed.

Optionally, in the method for handling cell connection failure in the embodiments of this disclosure, the step S103 may be implemented through different embodiments, to ensure that a proper manner of handling connection failure can be determined timely and accurately.

With reference to embodiments, the following describes in detail a technical solution for handling connection failure according to serving cell related information.

Embodiment 3

In this specific embodiment, in a case that the serving cell related information is the number of cells, the step S103 may specifically include the following:

triggering a connection re-establishment procedure in a case that the number of cells is 1.

It can be understood that in a case that the terminal device has the target serving cell as its only serving cell, when it is determined that connecting to the target serving cell has failed, a connection re-establishment procedure can be directly triggered to handle the connection failure timely and efficiently, thereby autonomously recovering the cell connection and improving reliability of data transmission.

Embodiment 4

In this specific embodiment, in a case that the serving cell related information is a cell type, the step S103 may specifically include one of the following:

triggering a connection re-establishment procedure in a case that the target serving cell is a cell in a master cell group and that the terminal device has failed to connect to all cells in the mater cell group, or that the target serving cell is a primary cell; and reporting information related to the failure in connecting to the target serving cell, in a case that the target serving cell is a cell in a secondary cell group and that the terminal device has failed to connect to each cell in the secondary cell group, or that the target serving cell is the primary cell in the master cell group, or that the target serving cell is the primary secondary cell in the secondary cell group, or that the target serving cell is a secondary cell in the master cell group, or that the target serving cell is a secondary cell in the secondary cell group.

It can be understood that there may be a variety of cell types for the serving cells of the terminal device, and when it is determined that connecting to the target serving cell has failed, a proper connection failure handling manner may be determined based on a specific type of the target service cell, so as to handle the connection failure timely and efficiently, thereby autonomously recovering the cell connection and improving reliability of data transmission.

For example, when the terminal device operates in a dual connectivity (DC) mode, the terminal device may be configured with two cell groups, namely, a master cell group (MCG) and a secondary cell group (SCG). The MCG includes at least a primary cell (PCell), an additional MCG may further include one or more secondary cells (SCell), the SCG includes at least a primary secondary cell (PSCell), and an additional SCG may further include one or more secondary cells (SCell).

Then on one hand, in a case that the target serving cell is a cell in the master cell group and that the terminal device has failed to connect to each cell in the master cell group, a connection re-establishment procedure can be directly triggered to handle the connection failure timely and efficiently, thereby autonomously recovering the cell connection and improving reliability of data transmission.

Or, in a case that the target serving cell is the primary cell, a connection re-establishment procedure can be directly triggered, to handle the connection failure timely and efficiently, thereby autonomously recovering the cell connection.

On the other hand, in a case that the target serving cell is a cell in the secondary cell group and that the terminal device has failed to connect to each cell in the secondary cell group, the terminal device may select to report information related to the failure in connecting to the target serving cell for reference by a network-side device in adjusting a configuration, thereby autonomously recovering the cell connection. Optionally, a secondary cell in the master cell group is used to report the information related to the failure in connecting to the target serving cell.

Or, in a case that the target serving cell is any one of cells in the master cell group, that is, the primary cell in the master cell group or any one of secondary cells in the master cell group, the terminal device may select to report information related to the failure in connecting to the target serving cell for reference by a network-side device in adjusting a configuration, thereby autonomously recovering the cell connection.

Optionally, when the target serving cell is the primary cell, the terminal device may report information related to the failure in connecting to the target serving cell through a secondary cell in the master cell group or the secondary cell group; and when the target serving cell is any one of secondary cells in the mater cell group, the terminal device may report information related to the failure in connecting to the target serving cell through another cell that does not fail in connecting in the master cell group or secondary cell group.

Or, in a case that the target serving cell is any one of cells in the secondary cell group, that is, the primary secondary cell in the secondary cell group or any one of secondary cells in the secondary cell group, the terminal device may select to report information related to the failure in connecting to the target serving cell for reference by a network-side device in adjusting a configuration, thereby autonomously recovering the cell connection. Optionally, when the target serving cell is the primary secondary cell, the terminal device may report information related to the failure in connecting to the target serving cell through a secondary cell in the master cell group or the secondary cell group; and when the target serving cell is any one of secondary cells in the secondary cell group, the terminal device may report information related to the failure in connecting to the target serving cell through another cell that does not fail in connecting in the master cell group or secondary cell group.

Optionally, in any one of the foregoing embodiments, in the triggering a connection re-establishment procedure, the terminal device needs to re-select a cell, with details as follows, including:

determining candidate frequencies, where the candidate frequencies do not include a frequency corresponding to the target serving cell, or the candidate frequencies do not include a frequency corresponding to the target serving cell for a preset time length; and triggering a connection re-establishment procedure based on the candidate frequencies.

It can be understood that to improve efficiency of the connection re-establishment procedure, in determining candidate frequencies for connection re-establishment, optionally the candidate frequencies are determined from frequencies other than the frequency corresponding to the target serving cell that is determined to have failed in connecting.

Optionally, considering that a cause resulting in a failed uplink transmission, for example, a channel being occupied, may end after a period of time, that is, the channel may resume a free state and may be used for uplink signal transmission in this case, therefore, to further improve efficiency of the connection re-establishment procedure, the connection re-establishment can be performed within a wider range of candidate frequencies. To be specific, only for a specified period of time (that is, a preset time length, for example, 30 seconds), the frequency corresponding to the target serving cell may not be a candidate frequency.

It should be noted that the value taken for the preset time length may be a value configured by a network-side device, or a value prescribed by a protocol. Optionally, in any one of the foregoing embodiments, if triggering a connection re-establishment procedure is selected as the manner of handling connection failure, in the triggering a connection re-establishment procedure or after triggering a connection re-establishment procedure, the method may further include:

reporting information related to the failure in connecting to the target serving cell.

Optionally, in any one of the foregoing embodiments, the information that is reported to a network-side device and related to the failure in connecting to the target serving cell includes at least one of the following:

failure type indication information of the cell connection failure; or channel measurement information, where the channel measurement information includes at least one of a received signal strength indicator, a channel occupancy ratio, or a channel busy ratio.

It can be understood that the failure type indication information may include LBT failure indication information, and the channel measurement information is specifically channel busy related measurement information.

It should be noted that in the embodiments of this disclosure, the information related to the failure in connecting to the target serving cell includes, but is not limited to, at least one of the failure type indication information or the channel measurement information, and the channel measurement information includes, but is not limited to, at least one of the received signal strength indicator (RSSI), the channel occupancy ratio (CR), or the channel busy ratio (CBR).

Figure 4:
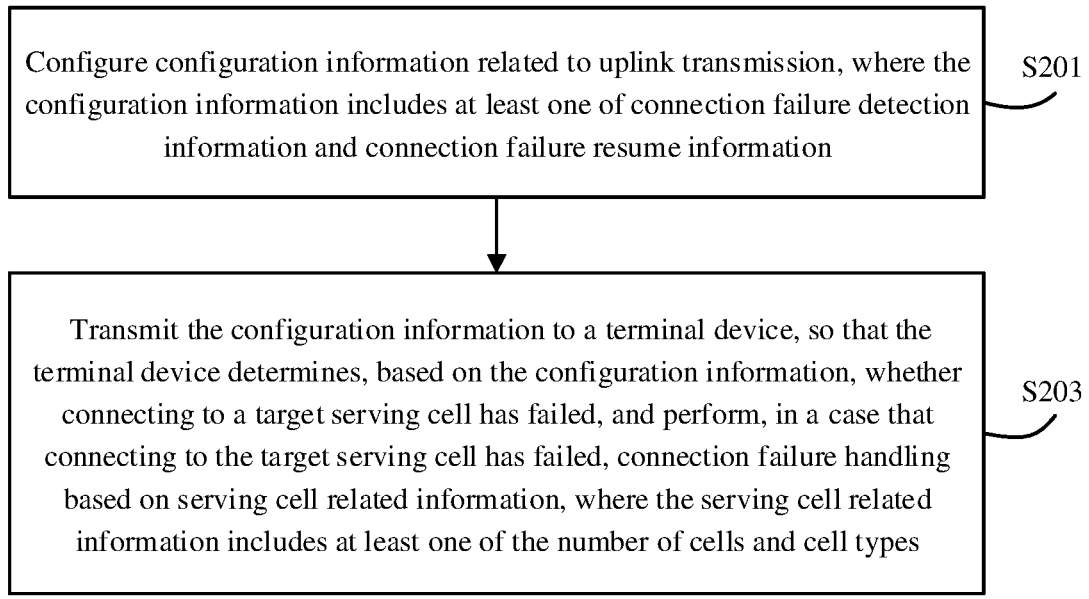
FIG. 4 is a schematic flowchart of a second method for handling cell connection failure according to an embodiment of this disclosure.

Corresponding to the method for handling cell connection failure in FIG. 1 that is performed by the terminal device, a method for handling cell connection failure, applied to a network-side device, is further provided in an embodiment of this disclosure. Referring to FIG. 4, the method includes the following steps.

S201: Configure configuration information related to uplink transmission, where the configuration information includes at least one of connection failure detection information and connection failure recovery information.

S203: Transmit the configuration information to a terminal device, so that the terminal device determines, based on the configuration information, whether connecting to a target serving cell has failed, and in a case that connecting to the target serving cell has failed, performs connection failure handling based on serving cell related information, where the serving cell related information includes at least one of the number of cells and a cell type.

In the embodiments of this disclosure, by configuring configuration information related to uplink transmission, so that the terminal device performs, based on the configuration information of at least one of connection failure detection information and connection failure recovery information, a detection of whether connecting to a target serving cell has failed, and in a case determining that connecting to the target serving cell has failed, corresponding connection failure handling is performed based on serving cell related information. Specifically, the connection failure handling may be implemented at least based on one of the number of serving cells and a cell type. As such, configuration information related to uplink transmission is configured, and the terminal device may be able to accurately detect a cell connection failure, and determine a proper connection failure handling manner for the cell connection failure based on specific related information of the serving cell, so as to handle the failure timely and efficiently according to the connection failure handling manner, thereby autonomously recovering the cell connection and improving reliability of data transmission.

It should be noted that the configuration information related to uplink transmission includes, but is not limited to, at least one of connection failure detection information and connection failure recovery information.

Optionally, in the method for handling cell connection failure in the embodiments of this disclosure, in a case that the configuration information includes the connection failure detection information, the connection failure detection information includes, but is not limited to, at least one of the following:

a time length of a first preset time window, where the first preset time window is used for determining the number of uplink transmission failures on the target serving cell; and a value of threshold regarding the number of failures, used for comparing with the number of uplink transmission failures;

a failure probability threshold, used for comparing with an uplink transmission failure probability determined based on the number of uplink transmission failures;

a time length of a second preset time window, where the second preset time window is configured to determine an uplink transmission state on the target serving cell;

a first count threshold, used for comparing with a first count value used when the uplink transmission state is a first preset state;

a second count threshold, used for comparing with a second count value used when the uplink transmission state is a second preset state; or a timing threshold of an uplink transmission failure timer, where the timing threshold is used for the terminal device to determine whether the uplink transmission failure timer expires.

It can be understood that by configuring the connection failure detection information for the terminal device, a purpose of increasing efficiency and accuracy of cell connection failure detection is achieved.

Specifically, the terminal device may detect whether a cell connection has failed according to the number of uplink transmission failures within the first preset time window, and may determine that connecting to the target serving cell has failed in a case determining that the number of uplink transmission failures is greater than or equal to a value of threshold regarding the number of failures, or in a case that the uplink transmission failure probability determined based on the number of uplink transmission failures is greater than or equal to the failure probability threshold.

In addition, the terminal device may also detect whether a cell connection has failed according to the statistics of the uplink transmission states on the target serving cell corresponding to each second preset time window, may directly determine that connecting to the target serving cell has failed in a case determining that the first count value of the first preset state is greater than or equal to the first count threshold, or may determine that connecting to the target serving cell has failed after determining that the first count value is greater than or equal to the first count threshold and a timing value of the uplink transmission failure timer has exceeded a timing threshold. Moreover, the terminal device may further take the occurrences of the second preset state different from the first preset state into account in the statistical process of uplink transmission states, thereby performing more accurate and reliable cell connection failure detection.

Optionally, in the method for handling cell connection failure in the embodiments of this disclosure, the first preset state includes at least one of the following: within the second preset time window, the number of uplink transmission failures on the target serving cell meets a first condition, or within the second preset time window, the number of uplink transmissions on the target serving cell is less than or equal to a number of uplink transmissions threshold; and the second preset state includes at least one of the following: within the second preset time window, the number of successful uplink transmissions on the target serving cell meets a second condition, or within the second preset time window, the number of uplink transmissions on the target serving cell is less than or equal to a number of uplink transmissions threshold.

Optionally, the connection failure detection information at least further includes the number of uplink transmissions threshold.

Optionally, in the method for handling cell connection failure in the embodiments of this disclosure, in a case that the configuration information includes the connection failure recovery information, the connection failure recovery information includes, but is not limited to:

a time length during which candidate frequencies used for a connection re-establishment procedure do not include the frequency corresponding to the target serving cell.

It can be understood that by configuring the connection failure recovery information for the terminal device, the purposes of improving efficiency of the connection re-establishment procedure, and enabling the terminal device to perform the connection re-establishment within a wider range of candidate frequencies can be achieved. To be specific, only for a specified period of time (that is, a preset time length, for example, 30 seconds), the terminal device may be set to not take the frequency corresponding to the target serving cell as a candidate frequency. In other words, considering that a cause resulting in a failed uplink transmission, for example, a channel being occupied, may end after a period of time, that is, the channel may resume a free state and may be used for uplink signal transmission in this case.

Optionally, in the method for handling cell connection failure in the embodiments of this disclosure, the method may further include the following:

receiving information related to the failure in connecting to the target serving cell, where the information related to the failure in connecting to the target serving cell includes at least one of the following:

failure type indication information of the cell connection failure; or channel measurement information, where the channel measurement information includes at least one of a received signal strength indicator, a channel occupancy ratio, or a channel busy ratio.

It can be understood that in a case that the terminal device determines that connecting to the target serving cell has failed, the information that is reported by the terminal device and related to connecting to the target serving cell is received for reference in adjusting relevant configuration information timely, to autonomously recover the cell connection.

The failure type indication information may include LBT failure indication information, and the channel measurement information is specifically channel busy related measurement information.

It should be noted that in the embodiments of this disclosure, the information related to the failure in connecting to the target serving cell includes, but is not limited to, at least one of the failure type indication information or the channel measurement information, and the channel measurement information includes, but is not limited to, at least one of the received signal strength indicator, the channel occupancy ratio, or the channel busy ratio.

Figure 5:
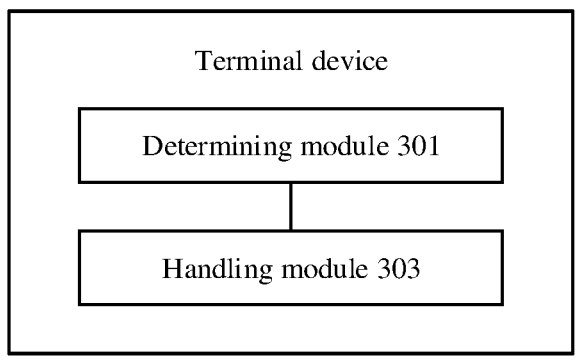
FIG. 5 is a schematic structural diagram of a terminal device according to an embodiment of this disclosure.

Referring to FIG. 5, a terminal device is provided in this embodiment of this disclosure, where the terminal device includes:

a determining module 301, configured to determine whether connecting to a target serving cell has failed; and a handling module 303, configured to: in a case that connecting to the target serving cell has failed, perform connection failure handling based on serving cell related information, where the serving cell related information includes at least one of the number of cells and a cell type.

Optionally, in the terminal device of this embodiment of this disclosure, the determining module 301 may specifically include:

a first determining submodule, configured to determine the number of uplink transmission failures on the target serving cell within a first preset time window; and a second determining submodule, configured to determine, based on the number of uplink transmission failures, whether connecting to the target serving cell has failed.

Optionally, in the terminal device in this embodiment of this disclosure, the second determining submodule may specifically be configured to:

determine that connecting to the target serving cell has failed if the number of uplink transmission failures is greater than or equal to a value of threshold regarding the number of failures.

Optionally, in the terminal device in this embodiment of this disclosure, the second determining submodule may specifically be configured to: determine an uplink transmission failure probability based on the number of uplink transmission failures; and determine that connecting to the target serving cell has failed if the uplink transmission failure probability is greater than or equal to a failure probability threshold.

Optionally, in the terminal device in this embodiment of this disclosure, the foregoing number of uplink transmission failures is a total number of consecutive and failed uplink transmissions.

Optionally, the terminal device in this embodiment of this disclosure may further include:

a control module, configured to increase a first count value by 1 if an uplink transmission state on the target serving cell is a first preset state; and the determining module 301 may specifically be configured to:

determine that connecting to the target serving cell has failed, if the first count value is greater than or equal to a first count threshold, or after the first count value is greater than or equal to the first count threshold and an uplink transmission failure timer expires.

Optionally, in the terminal device in this embodiment of this disclosure, the control module may further be configured to:

reset the first count value if an uplink transmission state on the target serving cell is a second preset state, and increase the first count value by 1 if an uplink transmission state on the target serving cell is the first preset state.

Optionally, the terminal device in this embodiment of this disclosure may further include:

an execution module, configured to, after the first count value is greater than or equal to the first count threshold and before the uplink transmission failure timer expires, perform at least one of operations of resetting the first count value or stopping the uplink transmission failure timer, in a case that a second count value used when the uplink transmission state on the target serving cell is a second preset state is greater than or equal to a second count threshold.

Optionally, in the terminal device in this embodiment of this disclosure, the second count value is the total number of consecutive times that the uplink transmission state on the target serving cell is the second preset state.

Optionally, in the terminal device in this embodiment of this disclosure, the first preset state includes at least one of the following: within the second preset time window, the number of uplink transmission failures on the target serving cell meets a first condition, or within the second preset time window, the number of uplink transmissions on the target serving cell is less than or equal to a number of uplink transmissions threshold; and the second preset state includes at least one of the following: within the second preset time window, the number of successful uplink transmissions on the target serving cell meets a second condition, or within the second preset time window, the number of uplink transmissions on the target serving cell is less than or equal to a number of uplink transmissions threshold.

Optionally, in the terminal device in this embodiment of this disclosure, the failed uplink transmission on the target serving cell is caused by channel occupation.

Optionally, in the terminal device of this embodiment of this disclosure, in a case that the serving cell related information is the number of cells, the handling module 303 may specifically be configured to:

trigger a connection re-establishment procedure in a case that the number of cells is 1.

Optionally, in the terminal device of this embodiment of this disclosure, in a case that the serving cell related information is a cell type, the handling module 303 may specifically be configured to perform one of the following:

trigger a connection re-establishment procedure in a case that the target serving cell is a cell in a master cell group and that the terminal device has failed to connect to all cells in the mater cell group, or that the target serving cell is a primary cell; and report information related to the failure in connecting to the target serving cell, in a case that the target serving cell is a cell in a secondary cell group and that the terminal device has failed to connect to each cell in the secondary cell group, or that the target serving cell is the primary cell in the master cell group, or that the target serving cell is the primary secondary cell in the secondary cell group, or that the target serving cell is a secondary cell in the master cell group, or that the target serving cell is a secondary cell in the secondary cell group.

Optionally, in the terminal device of this embodiment of this disclosure, the handling module 303 may specifically include:

a third determining submodule, configured to determine candidate frequencies, where the candidate frequencies do not include a frequency corresponding to the target serving cell, or the candidate frequencies do not include a frequency corresponding to the target serving cell for a preset time length; and a handling submodule, configured to trigger a connection re-establishment procedure based on candidate frequencies.

Optionally, in the terminal device in this embodiment of this disclosure, in triggering a connection re-establishment procedure or after triggering a connection re-establishment procedure, the handling module 303 may further be configured to:

report information related to the failure in connecting to the target serving cell.

Optionally, in the terminal device in this embodiment of this disclosure, the information related to the failure in connecting to the target serving cell includes at least one of the following:

failure type indication information of the cell connection failure; or channel measurement information, where the channel measurement information includes at least one of a received signal strength indicator, a channel occupancy ratio, or a channel busy ratio.

It can be understood that the terminal device in this embodiment of this disclosure can implement the method for handling cell connection failure that is performed by a terminal device, descriptions about the method for handling cell connection failure are all applicable to the terminal device, and details are not described herein again.

In this embodiment of this disclosure, whether connecting to a target serving cell has failed is monitored, and in a case of determining that connecting to the target serving cell has failed, corresponding connection failure handling is performed based on serving cell related information. Specifically, the connection failure handling may be performed based on at least one of the number of serving cells and a cell type. As such, a cell connection failure is accurately detected, and a proper connection failure handling manner is determined for the cell connection failure based on specific related information of the serving cell, so as to handle the failure timely and efficiently according to the connection failure handling manner, thereby autonomously recovering the cell connection and improving reliability of data transmission.

Figure 6:
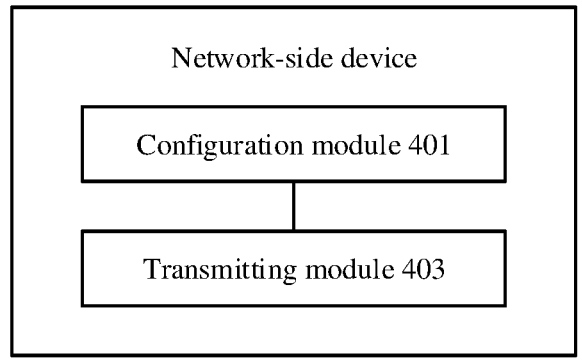
FIG. 6 is a schematic structural diagram of a network-side device according to an embodiment of this disclosure.

Referring to FIG. 6, a network-side device is provided in this embodiment of this disclosure, where the network-side device includes:
- a configuration module 401, configured to configure configuration information related to uplink transmission, where the configuration information includes at least one of connection failure detection information and connection failure recovery information; and
- a transmitting module 403, configured to transmit the configuration information to a terminal device, so that the terminal device determines, based on the configuration information, whether connecting to a target serving cell has failed, and in a case that connecting to the target serving cell has failed, performs connection failure handling based on serving cell related information, where the serving cell related information includes at least one of the number of cells and a cell type.

Optionally, in the network-side device in this embodiment of this disclosure, in a case that the configuration information includes the connection failure detection information, the connection failure detection information includes at least one of the following:
- a time length of a first preset time window, where the first preset time window is used for determining the number of uplink transmission failures on the target serving cell; and
- a value of threshold regarding the number of failures, used for comparing with the number of uplink transmission failures;
- a failure probability threshold, used for comparing with an uplink transmission failure probability determined based on the number of uplink transmission failures;
- a time length of a second preset time window, where the second preset time window is configured to determine an uplink transmission state on the target serving cell;
- a first count threshold, used for comparing with a first count value used when the uplink transmission state is a first preset state;
- a second count threshold, used for comparing with a second count value used when the uplink transmission state is a second preset state; or
- a timing threshold of an uplink transmission failure timer, where the timing threshold is used for the terminal device to determine whether the uplink transmission failure timer expires.

Optionally, in the network-side device in this embodiment of this disclosure, in a case that the configuration information includes the connection failure recovery information, the connection recovery detection information includes:
- a time length during which candidate frequencies used for a connection re-establishment procedure do not include the frequency corresponding to the target serving cell.

Optionally, the network-side device in this embodiment of this disclosure may further include:

- a receiving module, configured to receive information related to the failure in connecting to the target serving cell, where the information related to the failure in connecting to the target serving cell includes at least one of the following:
- failure type indication information of the cell connection failure; or
- channel measurement information, where the channel measurement information includes at least one of a received signal strength indicator, a channel occupancy ratio, or a channel busy ratio.

It can be understood that the network-side device in this embodiment of this disclosure can implement the method for handling cell connection failure that is performed by a network-side device, descriptions about the method for handling cell connection failure are all applicable to the network-side device, and details are not described herein again.

In the embodiments of this disclosure, by configuring configuration information related to uplink transmission, so that the terminal device performs, based on the configuration information of at least one of connection failure detection information and connection failure recovery information, a detection of whether connecting to a target serving cell has failed, and in a case determining that connecting to the target serving cell has failed, corresponding connection failure handling is performed based on serving cell related information. Specifically, the connection failure handling may be implemented at least based on one of the number of serving cells and a cell type. As such, configuration information related to uplink transmission is configured, and the terminal device may be able to accurately detect a cell connection failure, and determine a proper connection failure handling manner for the cell connection failure based on specific related information of the serving cell, so as to handle the failure timely and efficiently according to the connection failure handling manner, thereby autonomously recovering the cell connection and improving reliability of data transmission.

Figure 7:
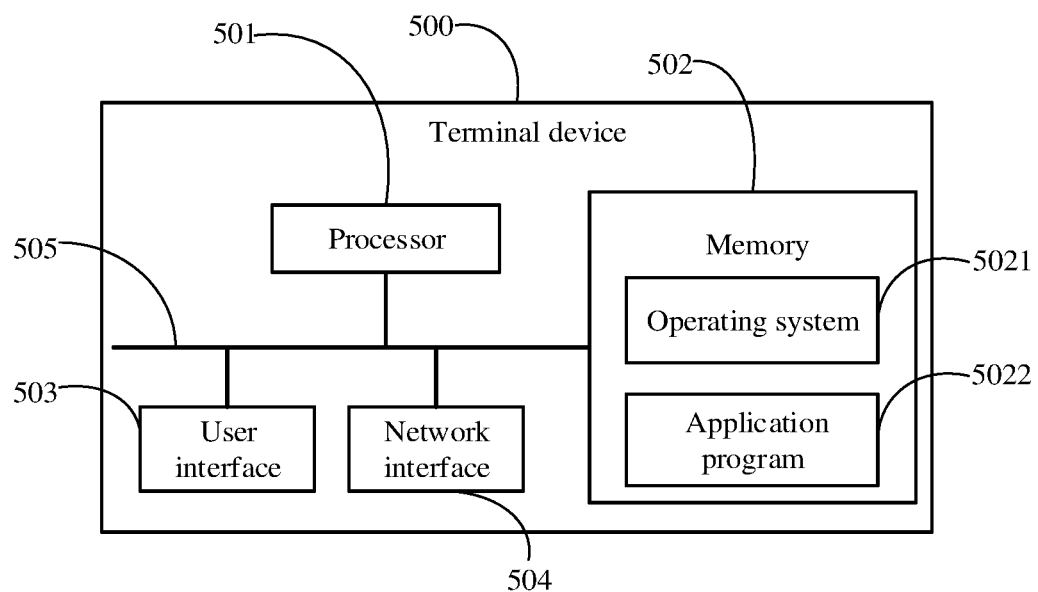
FIG. 7 is a schematic structural diagram of a second terminal device according to an embodiment of this disclosure.

FIG. 7 is a block diagram of a terminal device according to another embodiment of this disclosure. The terminal device 500 shown in FIG. 7 includes at least one processor 501, a memory 502, at least one network interface 504, and a user interface 503. The components in the terminal device 500 are coupled together through a bus system 505. It can be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 7.

The user interface 503 may include a display, a keyboard, a pointing device (for example, a mouse or a trackball), a touch panel, or a touchscreen.

It can be understood that the memory 502 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 502 of the system and the method described in the embodiments of this disclosure is intended to include but not be limited to these and any other applicable types of memories.

In some implementations, the memory 502 stores the following elements: an executable module or a data structure, or a subset thereof, or an extended set thereof: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player and a browser, which are used to implement various application services. A program for implementing the method in the embodiments of this disclosure may be included in the application program 5022.

In this embodiment of this disclosure, the terminal device 500 further includes a computer program stored in the memory 502 and capable of running on the processor 501. When being executed by the processor 501, the computer program implements the following steps:
  determining whether connecting to a target serving cell has failed; and
  performing connection failure handling based on serving cell related information in a case that connecting to the target serving cell has failed, where the serving cell related information includes at least one of the number of cells and a cell type.

The methods disclosed in the foregoing embodiments of this disclosure may be applied to the processor 501, or may be implemented by the processor 501. The processor 501 may be an integrated circuit chip, having a signal processing capability. During implementation, the steps of the foregoing method may be implemented by hardware integrated logic circuits in the processor 501 or instructions in the form of software. The foregoing processor 501 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor can implement or execute the methods, steps, and logical block diagrams disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 502, and the processor 501 fetches information in the memory 502, and completes the steps of the foregoing method in combination with its hardware. Specifically, the computer-readable storage medium stores a computer program, and when the computer program is executed by the processor 501, the steps in the foregoing embodiment of the method for handling cell connection failure are implemented.

It can be understood that the embodiments described in this disclosure may be implemented by hardware, software, firmware, middleware, microcode, or a combination thereof. For hardware implementation, a processing unit may be implemented in one or more application-specific integrated circuits (ASIC), digital signal processors (DSP), digital signal processing devices (DSP Device, DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented in the processor or external to the processor.

The terminal device 500 can implement the processes implemented by the terminal device in the foregoing embodiments. To avoid repetition, details are not described herein again.

In this embodiment of this disclosure, whether connecting to a target serving cell has failed is monitored, and in a case of determining that connecting to the target serving cell has failed, corresponding connection failure handling is performed based on serving cell related information. Specifically, the connection failure handling may be performed based on at least one of the number of serving cells and a cell type. As such, a cell connection failure is accurately detected, and a proper connection failure handling manner is determined for the cell connection failure based on specific related information of the serving cell, so as to handle the failure timely and efficiently according to the connection failure handling manner, thereby autonomously recovering the cell connection and improving reliability of data transmission.

Figure 8:
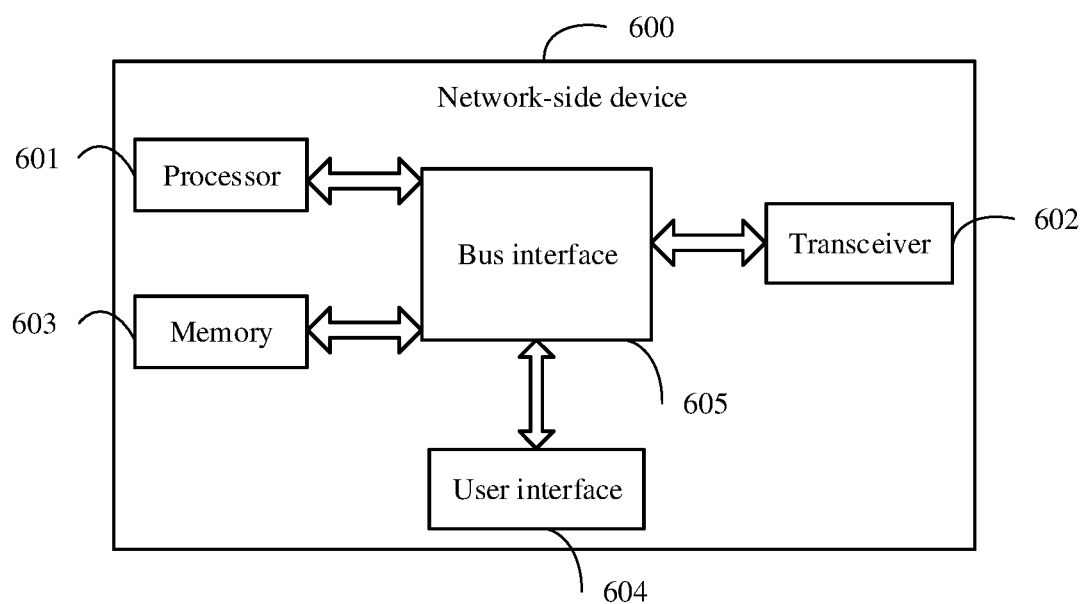
FIG. 8 is a schematic structural diagram of a second network-side device according to an embodiment of this disclosure.

Referring to FIG. 8, FIG. 8 is a structural diagram of a network-side device applied to an embodiment of this disclosure. The network-side device is capable of implementing details of the method for handling cell connection failure, applied to a network-side device, with the same effects achieved. As shown in FIG. 8, the network-side device 600 includes a processor 601, a transceiver 602, a memory 603, a user interface 604, and a bus interface 605.

In this embodiment of this disclosure, the network-side device 600 further includes a computer program stored in the memory 603 and capable of running on the processor 601, where when the computer program is executed by the processor 601, the following steps are implemented:
  configuring configuration information related to uplink transmission, where the configuration information includes at least one of connection failure detection information and connection failure recovery information; and
  transmitting the configuration information to a terminal device, so that the terminal device determines, based on the configuration information, whether connecting to a target serving cell has failed, and in a case that connecting to the target serving cell has failed, performs connection failure handling based on serving cell related information, where the serving cell related information includes at least one of the number of cells and a cell type.

In FIG. 8, a bus architecture may include any quantity of interconnected buses and bridges, and specifically connect together various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface 605 provides interfaces. The transceiver 602 may be a plurality of components, including a transmitter and a receiver, and provides units for communicating with a variety of other apparatuses on a transmission medium. For different user equipment, the user interface 604 may also be an interface capable of externally or internally connecting a required device, and the connected device includes but is not limited to a keypad, a display, a speaker, a microphone, a joystick, and the like.

The processor 601 is responsible for management of the bus architecture and general processing, and the memory 603 may store data for use by the processor 601 when the processor 601 performs an operation.

In the embodiments of this disclosure, by configuring configuration information related to uplink transmission, so that the terminal device performs, based on the configuration information of at least one of connection failure detection information and connection failure recovery information, a detection of whether connecting to a target serving cell has failed, and in a case determining that connecting to the target serving cell has failed, corresponding connection failure handling is performed based on serving cell related information. Specifically, the connection failure handling may be implemented at least based on one of the number of serving cells and a cell type. As such, configuration information related to uplink transmission is configured, and the terminal device may be able to accurately detect a cell connection failure, and determine a proper connection failure handling manner for the cell connection failure based on specific related information of the serving cell, so as to handle the failure timely and efficiently according to the connection failure handling manner, thereby autonomously recovering the cell connection and improving reliability of data transmission.

Optionally, a terminal device is further provided in an embodiment of this disclosure, including a processor, a memory, and a computer program stored in the memory and capable of running on the processor. When the computer program is executed by the processor, the processes in the foregoing embodiment of the method for handling cell connection failure are implemented, with the same technical effects achieved. To avoid repetition, details are not described herein again.

A computer readable storage medium is further provided in an embodiment of this disclosure, where a computer program is stored in the computer readable storage medium. When the computer program is executed by a processor, the processes in the foregoing embodiment of the method for handling cell connection failure that is applied to a terminal device are implemented, with the same technical effects achieved. To avoid repetition, details are not described herein again. For example, the computer-readable storage medium is a read-only memory (ROM), a random access memory (RAM), a magnetic disk, an optical disc, or the like.

Optionally, a network-side device is further provided in an embodiment of this disclosure, including a processor, a memory, and a computer program stored in the memory and capable of running on the processor. When the computer program is executed by the processor, the processes in the foregoing embodiment of the method for handling cell connection failure are implemented, with the same technical effects achieved. To avoid repetition, details are not described herein again.

A computer readable storage medium is further provided in an embodiment of this disclosure, where a computer program is stored in the computer readable storage medium. When the computer program is executed by a processor, the processes in the foregoing embodiment of the method for handling cell connection failure that is applied to a network-side device are implemented, with the same technical effects achieved. To avoid repetition, details are not described herein again. For example, the computer-readable storage medium is a read-only memory (ROM), a random access memory (RAM), a magnetic disk, an optical disc, or the like.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for handling cell connection failure, applied to a terminal device and comprising:
    determining whether connecting to a target serving cell has failed; and
    performing connection failure handling based on serving cell related information in response to that connecting to the target serving cell has failed, wherein the serving cell related information comprises at least one of the number of cells or a cell type;

wherein the determining whether connecting to a target serving cell has failed comprises: increasing a first count value by 1 in response to that an uplink transmission state on the target serving cell is a first preset state; and in response to that the first count value is greater than or equal to a first count threshold, or after the first count value is greater than or equal to the first count threshold and an uplink transmission failure timer expires, determining that connecting to the target serving cell has failed;

wherein the method further comprises: resetting the first count value in response to that an uplink transmission state on the target serving cell is a second preset state, and increasing the first count value by 1 in response to that an uplink transmission state on the target serving cell is the first preset state;

wherein the first preset state comprises at least one of the following: within the second preset time window, the number of uplink transmission failures on the target serving cell meets a first condition, or within the second preset time window, the number of uplink transmissions on the target serving cell is less than or equal to a number of uplink transmissions threshold; and the second preset state comprises at least one of the following: within the second preset time window, the number of successful uplink transmissions on the target serving cell meets a second condition, or within the second preset time window, the number of uplink transmissions on the target serving cell is less than or equal to a number of uplink transmissions threshold.

2. The method according to claim 1, wherein the determining whether connecting to a target serving cell has failed comprises:
determining the number of uplink transmission failures on the target serving cell within a first preset time window; and
determining, based on the number of uplink transmission failures, whether connecting to the target serving cell has failed.

3. The method according to claim 2, wherein the determining, based on the number of uplink transmission failures, whether connecting to the target serving cell has failed comprises:
determining that connecting to the target serving cell has failed in response to that the number of uplink transmission failures is greater than or equal to a value of threshold regarding the number of failures.

4. The method according to claim 3, wherein
the number of uplink transmission failures is a total number of consecutive and failed uplink transmissions.

5. The method according to claim 2, wherein the determining, based on the number of uplink transmission failures, whether connecting to the target serving cell has failed comprises:
determining an uplink transmission failure probability based on the number of uplink transmission failures; and
in response to that the uplink transmission failure probability is greater than or equal to a failure probability threshold, determining that connecting to the target serving cell has failed.

6. The method according to claim 2, wherein
the failed uplink transmission on the target serving cell is caused by channel occupation.

7. The method according to claim 1, further comprising:
after the first count value is greater than or equal to the first count threshold and before the uplink transmission failure timer expires, performing at least one of operations of resetting the first count value or stopping the uplink transmission failure timer, in response to that a second count value used when the uplink transmission state on the target serving cell is a second preset state is greater than or equal to a second count threshold.

8. The method according to claim 7, wherein
the second count value is the total number of consecutive times that the uplink transmission state on the target serving cell is the second preset state.

9. The method according to claim 1, wherein in response to that the serving cell related information is a cell type, the performing connection failure handling based on serving cell related information comprises at least one of the following:
triggering a connection re-establishment procedure in response to that the target serving cell is a cell in a master cell group and that the terminal device has failed to connect to each cell in the mater cell group, or that the target serving cell is a primary cell; or,
reporting information related to the failure in connecting to the target serving cell, in response to that the target serving cell is a cell in a secondary cell group and that the terminal device has failed to connect to each cell in the secondary cell group, or that the target serving cell is the primary cell in the master cell group, or that the target serving cell is the primary secondary cell in the secondary cell group, or that the target serving cell is a secondary cell in the master cell group, or that the target serving cell is a secondary cell in the secondary cell group.

10. The method according to claim 9, wherein the triggering a connection re-establishment procedure comprises:
determining candidate frequencies, wherein the candidate frequencies do not comprise a frequency corresponding to the target serving cell, or the candidate frequencies do not comprise a frequency corresponding to the target serving cell for a preset time length; and
triggering a connection re-establishment procedure based on the candidate frequencies.

11. The method according to claim 9, wherein the information related to the failure in connecting to the target serving cell comprises at least one of the following:
failure type indication information of the cell connection failure; or
channel measurement information, wherein the channel measurement information comprises at least one of a received signal strength indicator, a channel occupancy ratio, or a channel busy ratio.

12. The method according to claim 1, wherein the first preset state is different from the second preset state.

13. A method for handling cell connection failure, applied to a network-side device and comprising:
configuring configuration information related to uplink transmission, wherein the configuration information comprises at least one of connection failure detection information or connection failure recovery information; and
transmitting the configuration information to a terminal device, so that the terminal device determines, based on the configuration information, whether connecting to a target serving cell has failed, and in response to that connecting to the target serving cell has failed, performs connection failure handling based on serving cell related information, wherein the serving cell related information comprises at least one of the number of cells or a cell type;

wherein in response to that the configuration information comprises the connection failure detection information, the connection failure detection information comprises:
a first count threshold, used for comparing with a first count value used when the uplink transmission state is a first preset state;
a timing threshold of an uplink transmission failure timer, wherein the timing threshold is used for the terminal device to determine whether the uplink transmission failure timer expires.

14. The method according to claim 13, wherein the connection failure detection information further comprises at least one of the following:
a time length of a first preset time window, wherein the first preset time window is used for determining the number of uplink transmission failures on the target serving cell;
a value of threshold regarding the number of failures, used for comparing with the number of uplink transmission failures;
a failure probability threshold, used for comparing with an uplink transmission failure probability determined based on the number of uplink transmission failures;
a time length of a second preset time window, wherein the second preset time window is configured to determine an uplink transmission state on the target serving cell;
a second count threshold, used for comparing with a second count value used when the uplink transmission state is a second preset state.

15. The method according to claim 13, wherein in response to that the configuration information comprises the connection failure recovery information, the connection failure recovery information comprises:
a time length during which candidate frequencies used for a connection re-establishment procedure do not comprise the frequency corresponding to the target serving cell.

16. The method according to claim 13, further comprising:
receiving information related to the failure in connecting to the target serving cell, wherein the information related to the failure in connecting to the target serving cell comprises at least one of the following:
failure type indication information of the cell connection failure; or
channel measurement information, wherein the channel measurement information comprises at least one of a received signal strength indicator, a channel occupancy ratio, or a channel busy ratio.

17. A terminal device, comprising a memory, a processor, and a program stored in the memory and capable of running on the processor, wherein the program when executed by the processor, causes the processor to perform:
determining whether connecting to a target serving cell has failed; and
performing connection failure handling based on serving cell related information in response to that connecting to the target serving cell has failed, wherein the serving cell related information comprises at least one of the number of cells or a cell type;
wherein the processor is configured to: increase a first count value by 1 in response to that an uplink transmission state on the target serving cell is a first preset state; and determine that connecting to the target serving cell has failed, in response to that the first count value is greater than or equal to a first count threshold, or after the first count value is greater than or equal to the first count threshold and an uplink transmission failure timer expires;
wherein the processor is configured to: reset the first count value in response to that an uplink transmission state on the target serving cell is a second preset state, and increase the first count value by 1 in response to that an uplink transmission state on the target serving cell is the first preset state;
wherein the first preset state comprises at least one of the following: within the second preset time window, the number of uplink transmission failures on the target serving cell meets a first condition, or within the second preset time window, the number of uplink transmissions on the target serving cell is less than or equal to a number of uplink transmissions threshold; and
the second preset state comprises at least one of the following: within the second preset time window, the number of successful uplink transmissions on the target serving cell meets a second condition, or within the second preset time window, the number of uplink transmissions on the target serving cell is less than or equal to a number of uplink transmissions threshold.

18. The terminal device according to claim 17, wherein the first preset state is different from the second preset state.

19. A network-side device, comprising a memory, a processor, and a program stored in the memory and capable of running on the processor, wherein when the program is executed by the processor, the steps of the method according to claim 13 are implemented.

* * * * *